United States Patent
Infosino

(10) Patent No.: US 6,715,679 B1
(45) Date of Patent: Apr. 6, 2004

(54) UNIVERSAL MAGNETIC STRIPE CARD

(75) Inventor: William J. Infosino, Watchung, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/391,844

(22) Filed: Sep. 8, 1999

(51) Int. Cl.$^7$ ................................................ G06K 7/08
(52) U.S. Cl. ..................... 235/449; 235/493; 235/380; 705/41
(58) Field of Search .................... 235/379, 380, 235/382, 449, 487, 492, 493; 382/115, 116, 124; 705/17, 18, 39, 41, 44

(56) References Cited

U.S. PATENT DOCUMENTS

| | | | | |
|---|---|---|---|---|
| 4,582,985 A | * | 4/1986 | Löfberg ...................... | 235/380 |
| 4,752,676 A | * | 6/1988 | Leonard et al. ............. | 235/449 |
| 4,812,632 A | * | 3/1989 | Kakinuma et al. .......... | 235/449 |
| 4,837,422 A | * | 6/1989 | Dethloff et al. ............. | 235/380 |
| 5,541,985 A | * | 7/1996 | Ishii et al. ................... | 235/382 |
| 5,578,808 A | * | 11/1996 | Taylor ........................ | 235/380 |
| 5,585,787 A | * | 12/1996 | Wallerstein ................. | 235/380 |
| 5,623,552 A | | 4/1997 | Lane .......................... | 235/492 |
| 5,708,851 A | * | 1/1998 | Togawa ....................... | 710/52 |
| 5,748,737 A | * | 5/1998 | Daggar ....................... | 235/379 |
| 5,834,747 A | * | 11/1998 | Cooper ....................... | 235/449 |
| 5,844,230 A | * | 12/1998 | Lalonde ...................... | 235/487 |
| 5,886,333 A | * | 3/1999 | Miyake ....................... | 235/380 |
| 5,955,961 A | * | 9/1999 | Wallerstein ............. | 235/380 X |
| 5,984,191 A | * | 11/1999 | Chapin, Jr. ................. | 235/493 |
| 6,011,858 A | * | 1/2000 | Stock et al. ................. | 705/18 |
| 6,012,636 A | * | 1/2000 | Smith ......................... | 235/380 |
| 6,016,476 A | * | 1/2000 | Maes et al. .................. | 705/1 |
| 6,024,286 A | * | 2/2000 | Bradley et al. ............. | 235/492 |
| 6,111,977 A | * | 8/2000 | Scott et al. .................. | 382/124 |
| 6,170,753 B1 | * | 1/2001 | Takemura ................... | 235/486 |
| 6,213,391 B1 | * | 4/2001 | Lewis ........................ | 235/380 |
| 6,308,890 B1 | * | 10/2001 | Cooper ....................... | 235/449 |
| 6,315,195 B1 | * | 11/2001 | Ramachandran ........... | 235/380 |
| 6,494,367 B1 | * | 12/2002 | Zacharias ................... | 235/382 |
| 2001/0011250 A1 | * | 8/2001 | Paltenghe et al. ........... | 705/41 |
| 2002/0174016 A1 | * | 11/2002 | Cuervo ..................... | 705/41 X |
| 2003/0155416 A1 | * | 8/2003 | Macklin et al. ............. | 235/380 |

FOREIGN PATENT DOCUMENTS

| | | | |
|---|---|---|---|
| EP | 0793188 A2 | * | 9/1997 |
| JP | 10255007 A | * | 9/1998 |
| JP | 2001-236489 A | * | 8/2001 |
| WO | WO 94/17498 A1 | * | 8/1994 |
| WO | WO 99/05633 A1 | * | 2/1999 |

OTHER PUBLICATIONS http://www.idtek.com/technology.html, IDTEK Technology and Products, Jul. 29, 1999.
http://www.autoidnews.com/technologies/concepts/cardtech.txt, Technology Adds Functionality to ID Cards; Jun. 22, 1999.

* cited by examiner

*Primary Examiner*—Jared J. Fureman

(57) ABSTRACT

A credit card sized universal card that a user may transform at will into a credit card, ATM card, employee access card, and/or any other conventional magnetic-stripe type card. To prevent the card from being used by anyone other than its owner, a security test may be presented each time the user tries to transform the universal card. The security test may involve, for example, electronically comparing the user's fingerprint with the owner's fingerprint. A database may be generated containing the fingerprints of the owners of universal cards.

6 Claims, 6 Drawing Sheets

UNIVERSAL MAGNETIC STRIPE CARD

FIELD OF THE INVENTION

The present invention is directed generally to apparatus and methods for transforming a universal card into another card such as a credit card, ATM card, telephone card, etc.

BACKGROUND OF THE INVENTION

Today, the average person owns a number of different types of cards such as credit cards, debit cards, automatic teller machine (ATM) cards, employee identification cards, student identification cards, building access cards, club membership cards, airline frequent flyer cards, grocery store discount cards, department store account cards, telephone cards, video rental cards, public transportation fare cards, and the like. Many of the cards may each include a magnetic stripe for storing data such as the owner's identity or account information.

In order to have immediate access to these cards, the cards are often physically carried with the owner, such as in a wallet or purse. However, it can be inconvenient to carry a large number of cards. For one thing, large numbers of cards make for a bulky wallet. Also, it is time consuming to search through a wallet or purse for the desired card from a variety of cards that are all of the same size. Further, if a particular card is lost or stolen from a wallet or purse containing a large number of cards, it may be a long time before the owner discovers the disappearance of the particular card, especially if that card is not used every day. In addition, it can be risky to carry a large number of cards in one wallet or purse. When the wallet or purse is stolen, the thief has access to all of the cards contained therein.

One solution to some of the above problems that has been proposed is the smart card. A smart card is a card having a processor chip and a memory, wherein the memory may contain data such as the owner's identity and a variety of account information. Although smart cards are not in widespread use for a number of reasons, a person may, in theory, use a single smart card for a number of different uses, such as an identification card, an ATM card, or a credit card. Such a smart card would reduce the number of cards a person would need to carry.

One reason that smart cards are not in widespread use is that an entirely new infrastructure is necessary to support smart card use. Conventional magnetic-stripe card readers, such as are found in ATM machines, public telephones, and credit card readers, are not presently compatible with smart cards. These conventional readers are instead typically compatible with certain standards such as the ISO/IEC 7813 financial card transactions standard. In order to promote smart card use, all of the existing systems would need to be replaced, requiring a large up-front financial investment. Banks, stores, and other merchants are hesitant to be the first to invest in new smart card compatible machines, especially when very few consumers are using them.

Another reason that smart cards have not become popular is that the cards themselves are expensive. Unless a card supplier is willing to absorb the cost of a smart card, it is unlikely that consumers will want to be the first to obtain a smart card. Still another reason is that smart cards are inherently less robust than old-fashioned magnetic stripe cards. Conventional magnetic stripe cards are known for maintaining stored data even under physically abusive conditions. However, smart cards, which have sensitive electronic chips, are particularly vulnerable to static electricity, magnetic fields, extreme temperature, and ultraviolet light.

Thus, there is a need for an improved card system that allows a person to have access to a variety of different card types without having to carry a large number of cards, and that allows use of conventional magnetic stripe card reading equipment. There is also a need for improved security of cards in the event that a card is lost or stolen.

SUMMARY OF THE INVENTION

According to aspects of the present invention, a user may be provided with a "universal" and that can be transformed into one or more of any other card (hereafter referred to as the universal card "emulating" another card) authorized for use by the user and that has a magnetic stripe. Such other cards that the universal card may emulate include credit cards, debit cards, automatic teller machine (ATM) cards, employee identification cards, student identification cards, building access cards, club membership cards, airline frequent flyer cards, grocery store discount cards, department store account cards, telephone cards, video rental cards, public transportation fare cards, and the like. Thus, instead of having to carry many cards, the user need carry only this one universal card. The universal card may preferably have at least one re-writeable magnetic stripe for storing data associated with the card that the universal card is emulating.

According to further aspects of the present invention, a device, named herein a "universal reader/writer," may be provided for reading data stored on the magnetic stripe of the universal card and/or for changing the data stored on the magnetic stripe. A method for changing data stored on the universal card may include the steps of receiving account identification data of the universal card, determining a second card and a third card based on the account identification data of the universal card, the second and third cards each being identified by different account identification data, selecting one of the second and third cards, and writing the account identification data of the selected card onto at least one magnetic region of the universal card. Preferably, a security test for authenticating the user may be required to be passed before the universal card may be changed to emulate a different card.

The universal reader/writer may be embodied in many forms and sizes, and may even be small enough to fit in a standard wallet. The universal reader/writer may include, for example, an input device (such as a magnetic read head) for receiving and/or magnetically reading account identification data identifying the universal card, a processor coupled to the input device for determining a second card and a third card based on the account identification data of the universal card, the second and third cards each being identified by different account identification data, and a magnetic write head coupled to the processor for writing the account identification data of one of the second and third cards onto at least one magnetic region of the universal card. Preferably, an authorized agent may dispense universal reader/writers and universal cards as a set, and each universal reader/writer is preferably only able to read from and/or write to the universal card with which the universal reader/writer was dispensed.

According to further aspects of the present invention, the universal reader/writer may be incorporated into the universal card itself. For example, a universal card may include a memory for storing a first account identification data and a second account identification data, a control coupled to the memory for allowing a user to select either the first account identification data or the second identification data, a re-writeable magnetic storage region coupled to the memory, and a device for writing either the first or the second account identification data responsive to the control.

According to further aspects of the present invention, the universal reader/writer may be configured by an authorized agent so as to be able to transform the universal card into a selected one of a predetermined set of conventional cards. One method for accomplishing this is to store account identification data for the universal card to a database, store account identification data for a second card and a third card to the database, the database associating the account identification data of the universal card with the account identification data of the second and third cards, and store the account identification data for each of the universal card, the second card, and the third card into a memory of the universal reader/writer.

According to still further aspects of the present invention, a database may be provided for storing authentication data and data to be stored on the universal card. This database may be located at a bank or other merchant location, and/or on a network such that the database is accessible to a large number of parties.

These and other features of the invention will be apparent upon consideration of the following detailed description of preferred embodiments. Although the invention has been defined using the appended claims, these claims are exemplary in that the invention is intended to include the elements and steps described herein in any combination or subcombination. Accordingly, there are any number of alternative combinations for defining the invention, which incorporate one or more elements from the specification, including the description, claims, and drawings, in various combinations or subcombinations. It will be apparent to those skilled in the art, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention. In the accompanying drawings, elements are labeled with three-digit reference numbers, wherein the first digit of a reference number indicates the drawing number in which the element is first illustrated. The same reference number in different drawings refers to the same element.

DETAILED DESCRIPTION OF PREFERRED EMBODIMENTS

Figure 1A:
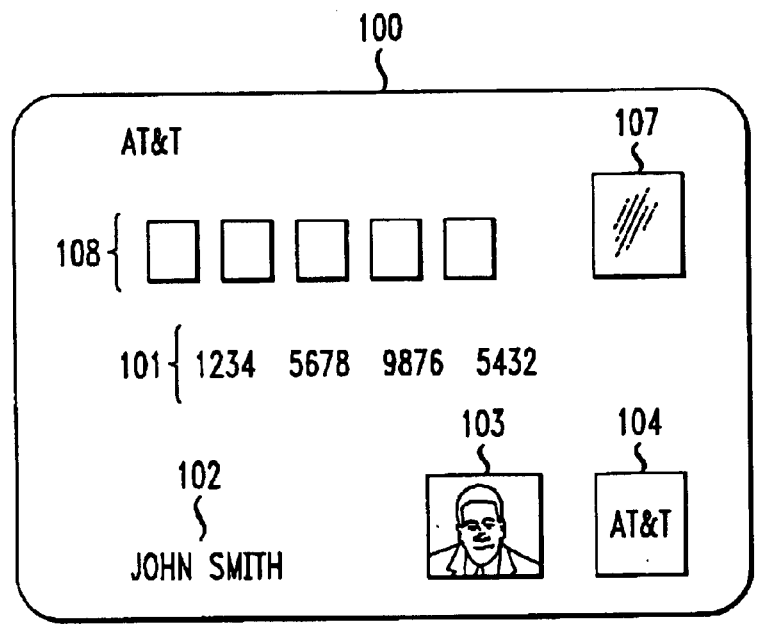
FIG. 1A is a front view of an exemplary embodiment of a universal card according to aspects of the present invention.

Referring to FIG. 1A, a universal card 100 may be imprinted with an account number such as a universal account number 101 uniquely identifying the universal card 100 and/or the owner's name 102. The universal card 100 may further include a picture such as the card owner's picture 103, and/or a security hologram 104. The universal card 100 may be of any size, shape or thickness, but it is preferable to make the universal card of such dimensions so as to be compatible with the standard used by conventional magnetic stripe card readers (e.g., ISO/IEC 7813). For example, it is preferable that the universal card 100 be configured to be physically and electronically compatible with standard automated teller machines (ATMs), credit card readers, etc. The universal card 100 may be, e.g., approximately 3⅜ inches by approximately 2⅛ inches, and approximately 1/32 of an inch in thickness.

Figure 1B:
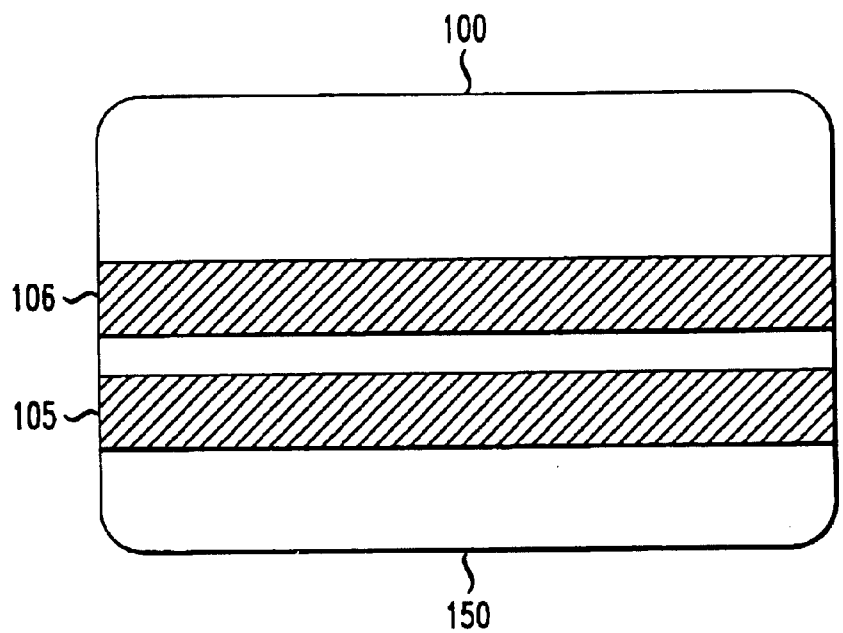
FIG. 1B is a back view of the universal card of FIG. 1A.

Referring to FIG. 1B, the universal card 100 may further include one or more magnetic regions, such as magnetic stripes 105, 106, for storing data such as the owner's identity and/or the owner's account information. The magnetic stripes 105, 106 may each extend partially or completely across the universal card, and at least one of the magnetic stripes 105, 106 may preferably be of a size compatible with standard magnetic stripe card readers such as ATMs and credit card readers. The magnetic stripes 105, 106 may each have a width of about 1/16 of an inch, about ⅛ of an inch, about 3/16 of an inch, about 5/16 of an inch, about ½ of an inch, about ¾ of an inch, or greater. Magnetic stripe 105 may be of a distance from the edge 150 of the card of about 1/16 of an inch, about ⅛ of an inch, about 3/16 of an inch, about ¼ of an inch, or greater. Although it is preferable that magnetic stripe 105 be of such dimensions so as to be compatible with standard magnetic stripe card readers, either of the magnetic stripes 105, 106 may be of any shape and/or size. For example, magnetic stripe 106 may be a spot or square of magnetic material instead of a stripe.

Figure 2A:
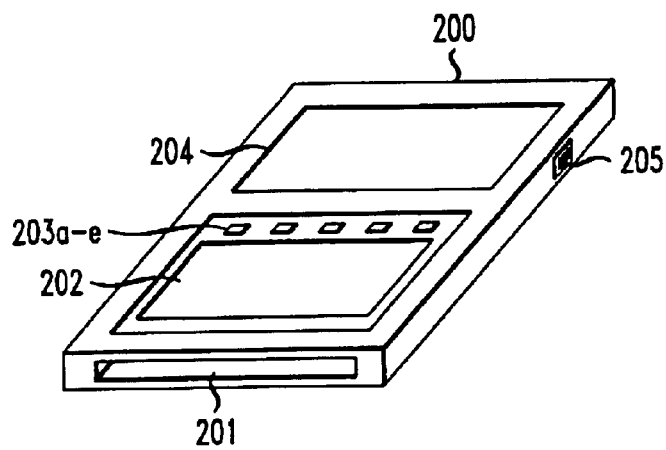
FIG. 2A is a perspective view of an exemplary embodiment of a universal reader/writer according to aspects of the present invention.

Referring to FIG. 2A, a portable version of a universal reader/writer 200 may include a slot 201 for receiving the universal card 100, a biometric interface such as a fingerprint reader 202, controls such as buttons 203, and/or a display 204. Fingerprint readers can now be made extremely small. For example, U.S. Pat. No. 5,623,552 to Lane, entitled "Self-Authenticating Identification Card With Fingerprint Identification," (hereby incorporated by reference herein in its entirety) discloses a fingerprint reader that is small enough to fit on an identification card. The display 204 may have a touch sensitive screen for receiving input from a user. The universal reader/writer 200 may also have an interface 205 to which a communications cable may be connected, for communicating with another device such as a computer, and/or for connecting the universal reader/writer 200 directly to a network. The interface 205 may be a wired interface, or a wireless interface such as an antenna for communicating via radio waves and/or an infra-red communications interface.

The universal reader/writer 200 may be a standalone device and/or integrated into some other device that the customer normally carries, such as a wireless phone and/or personal digital assistant. The universal reader/writer 200 may be relatively thin, for example having a thickness of between about ¼ inch and about ½ inch, or between about ½ inch and about one inch.

Figure 2B:
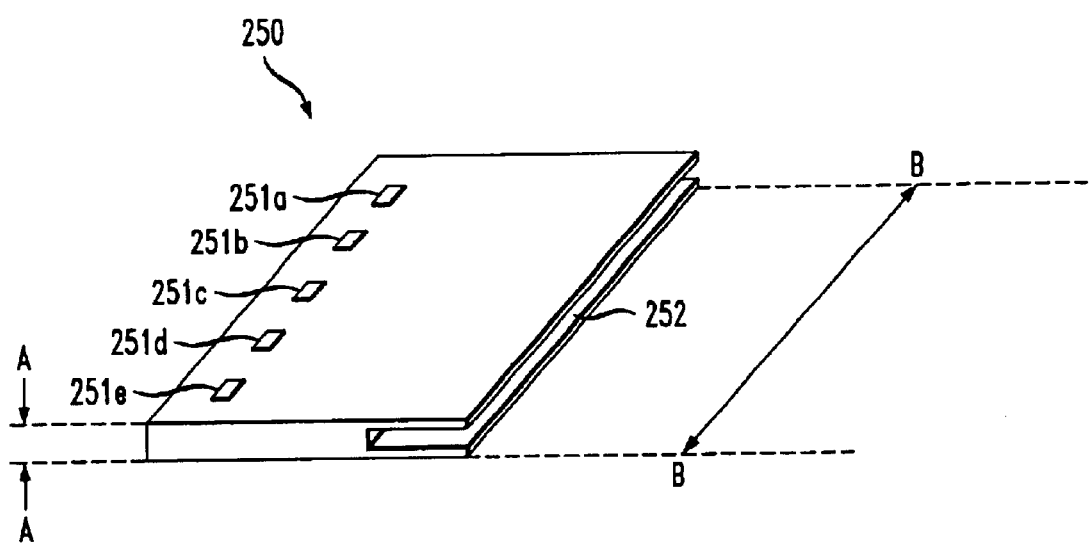
FIG. 2B is a perspective view of another exemplary embodiment of a universal reader/writer according to aspects of the present invention.

The universal reader/writer 200 may be small enough to fit in a standard-sized wallet, such as is shown in the exemplary embodiment of FIG. 2B. A universal reader/writer 250 may be quite thin, e.g., having a thickness A—A of only a little more than the universal card 100 itself. For example, the thickness A—A of the universal reader/writer 250 may be less than ⅛ of an inch in thickness, or between ⅛ and ¼ of an inch in thickness. In the exemplary embodiment shown, the universal reader/writer 250 may include a swipe-style slot 252 and a plurality of buttons 251*a–e*. Because a swipe-style slot is used instead of an insertion-style slot in this particular embodiment, the universal reader/writer 250 may have a length B—B shorter than the universal card 100. Thus, for example, the universal reader/writer 250 may have a length B—B of less than about three inches. The buttons 251*a–e* may be used to select the conventional card to be emulated, as will be discussed further below. Each of the buttons 251*a–e* may be labeled with the card to be emulated. To allow the universal reader/writer 250 to be slim, the buttons 251*a–e* may be of a style that does not protrude from the casing of the universal reader/writer 250. For example, the buttons 251*a–e* may be touch-sensitive pads. If the universal reader/writer 250 is made small enough, it could even be configured as a PCMCIA card that can plug into a PCMCIA slot of a laptop computer. The laptop computer could be used to configure the PCMCIA-style universal reader/writer 250 with the desired cards to be emulated.

If the universal reader/writer's components are made small enough, a universal reader/writer may be part of the magnetic stripes 105 and/or 106. U.S. Pat. No. 5,623,552 (already incorporated by reference herein) discloses compact magnetic stripe programming technology built into a card. Further, referring again to FIGS. 1A–B, an extremely thin fingerprint reader 107 may be incorporated onto the surface of the universal card 100 itself. As discussed above, a fingerprint reader small enough to fit on a card is disclosed in U.S. Pat. No. 5,623,552. IDTEK Licensing Group, of Durham, N.C., has licensed such compact fingerprint reading technology. Further, the universal card 100 may include one or more controls 108 such as touch-sensitive pads and/or buttons for selecting a card to be emulated. With all of the features required to operate the universal card 100 being built into the universal card 100, a separate universal reader/writer, such as universal reader/writer 200, is not necessary. With such an embodiment the ultimate in convenience and portability is obtained.

Figure 3:
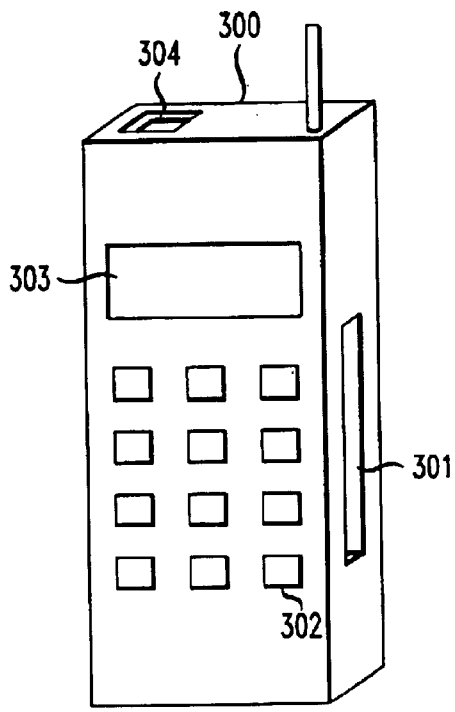
FIG. 3 is a perspective view of another exemplary embodiment of a universal reader/writer incorporated into a cellular telephone according to aspects of the present invention.

Referring to FIG. 3, a universal reader/writer according to aspects of the present invention may be incorporated into another device such as a cellular phone 300 and/or other portable or non-portable device. The cellular phone 300 may include any or all of the features found in any of the other universal reader/writers disclosed herein (such as universal reader/writer 200 shown in FIG. 2A), such as a slot 301 for receiving the universal card 100, controls 302, a display 303, and/or an interface 304 for connection with another device.

Figure 4:
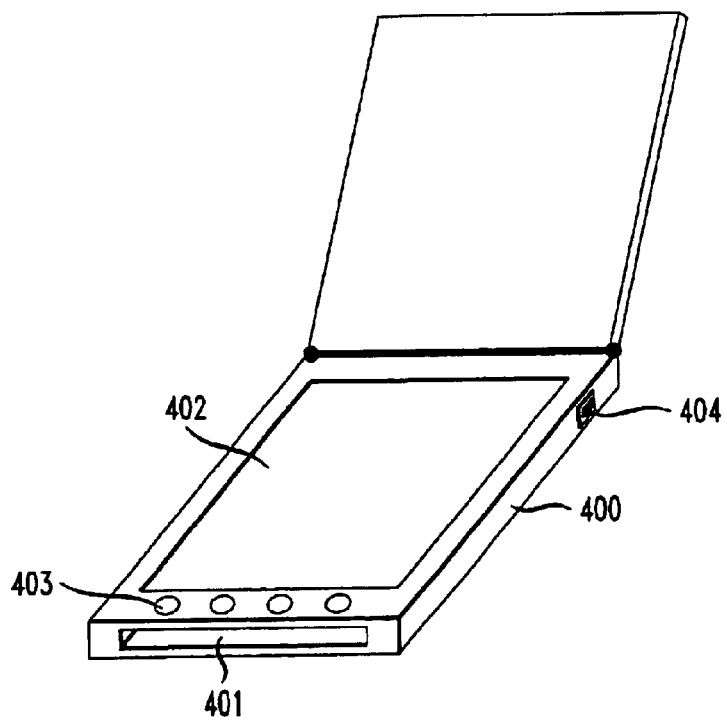
FIG. 4 is a perspective view of another exemplary embodiment of a universal reader/writer incorporated into a personal digital assistant according to aspects of the present invention.

Referring to FIG. 4, another example of a device that a universal reader/writer may be incorporated into is a personal digital assistant (PDA) 400 such as the Palm 3X marketed by 3-COM Corporation, and/or any other model of PDA 400 or other highly portable computing device or palmtop computer. The PDA 400 may include a slot 401 for receiving the universal card 100, a touch-sensitive display 402, and/or controls such as buttons 403. The PDA 400 may also have an interface 404 for connection with another device. Any data that the user inputs into the PDA 400 for control and/or security purposes may be entered via the touch-sensitive display 402, the buttons 403, and/or the interface 404. Because the PDA 400 is programmable and can run software applications, a software application may be stored and run on the PDA 400 for controlling data read from/written to the universal card 100 and/or for providing security. For example, the software application may require that the user enter a predetermined password such as a personal identification number (PIN) before being able to change any data written on the magnetic stripes 105 and/or 106 of the universal card 100.

Figure 5:
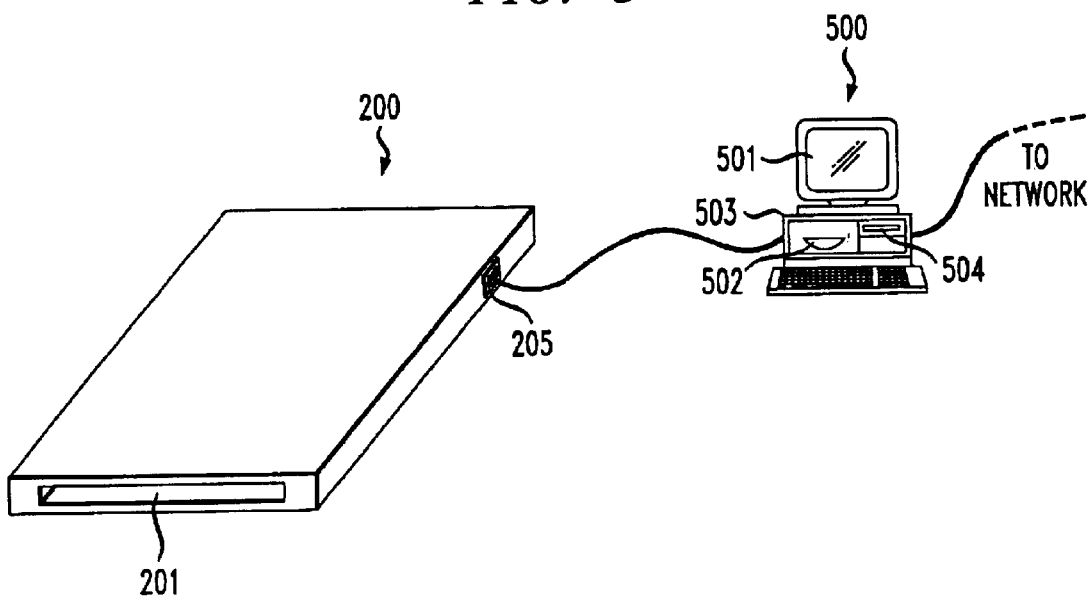
FIG. 5 is a perspective view of an exemplary embodiment of the universal reader/writer from FIG. 2A coupled to a terminal according to aspects of the present invention.
Figure 8:
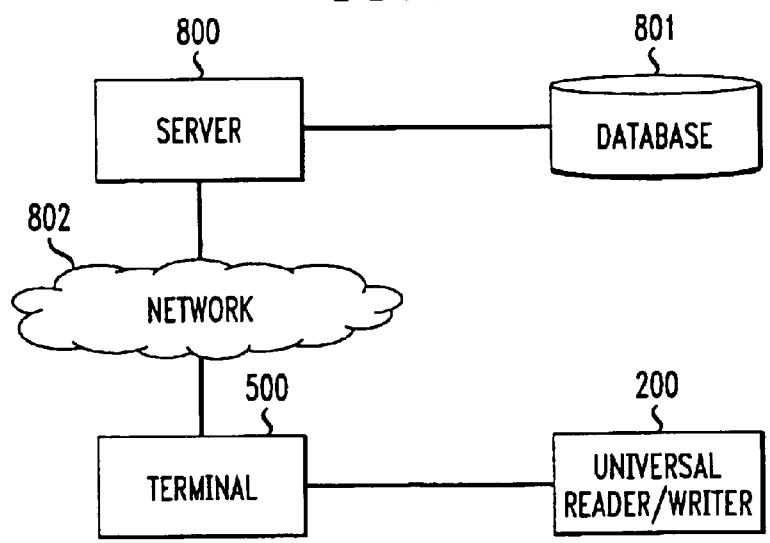
FIG. 8 is a functional block diagram of an exemplary embodiment of the universal reader/writer from FIG. 2A connected to the terminal from FIG. 5 according to aspects of the present invention.

Referring to FIG. 5, a universal reader/writer (such as universal reader/writer 200) according to aspects of the present invention may be connected to a terminal 500, such as a personal computer, which may be further connected to a network 802 (shown in FIG. 8). The terminal 500 may include a display 501, a biometric interface such as a fingerprint reader 502, a keyboard 503, and/or a card reader/writer 504. As will be discussed below, such a configuration allows the universal reader/writer 200 to be configured by the terminal 500. Although the universal reader/writer 200 is shown connected to the terminal 500, any of the embodiments discussed herein of a universal reader/writer may be connected to the terminal 500 in a similar manner.

Figure 6:
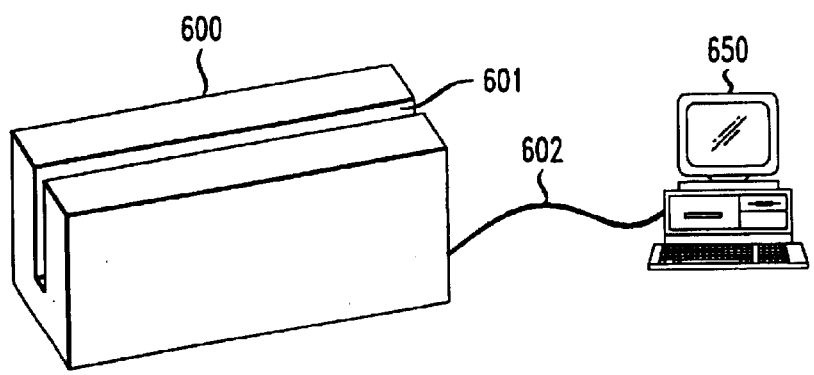
FIG. 6 is a perspective view of another exemplary embodiment of a universal reader/writer according to aspects of the present invention.

Referring to FIG. 6, an exemplary universal reader/writer 600 according to aspects of the present invention is shown having a swipe-style slot 601 of a different configuration than the insertion-style slots 201, 301, 401 previously shown in the figures. This type of swipe-style slot 601 may be used in any of the embodiments discussed herein. This particular embodiment of the universal reader/writer 600 does not have any user interface, only the slot 601. However, the universal reader/writer 600 has a connection to an external device (such as a personal computer 650) via a cable 602 or a wireless interface. The personal computer 650 may be used for data entry, data display, control of the universal reader/writer 600, and/or security verification.

Figure 7:
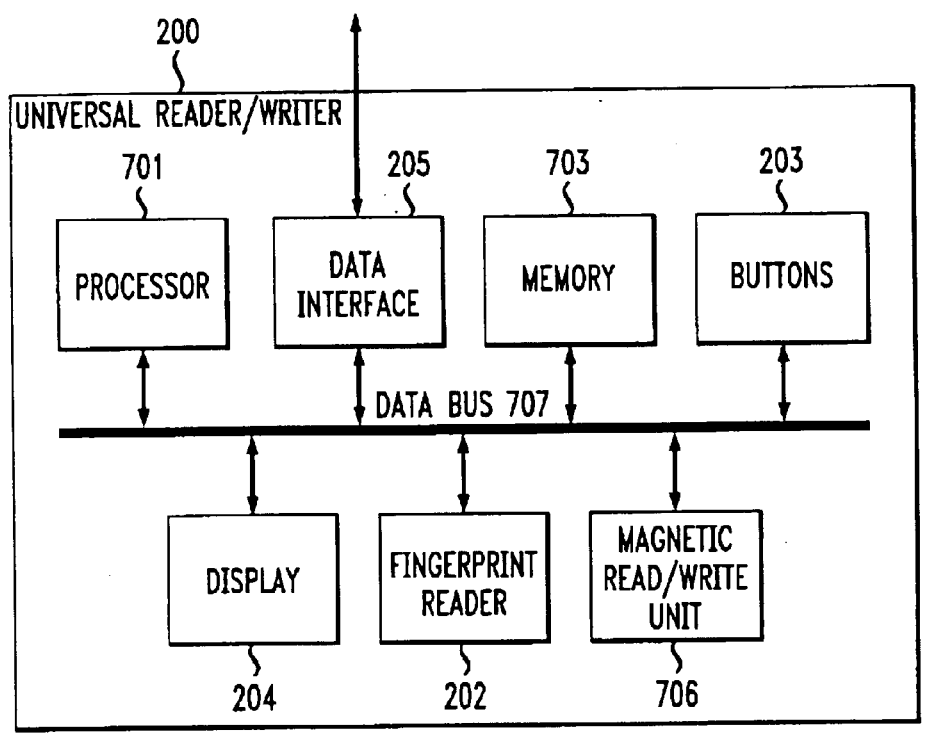
FIG. 7 is a functional block diagram of an exemplary embodiment of the universal reader/writer from FIG. 2A according to aspects of the present invention.

Referring to FIG. 7, an exemplary universal reader/writer 200 according to aspects of the present invention may include a processor 701, an interface 205 for receiving/sending data external from/to the universal reader/writer 200 (for example, for communicating with a computer and/or network), a memory 703 and/or another type of storage device such as a disk drive and/or hard drive, controls (such as buttons 203) for allowing a user to control the device and/or input data into the device (such as a PIN), a display 204, a security unit such as fingerprint reader 202, a magnetic read/write unit 706 located in the slot 201 and including a magnetic read/write head, and/or a data bus 707 for allowing the various components of the universal reader/writer 200 to intercommunicate.

Referring to FIG. 8, a universal reader/writer such as universal reader/writer 200 may have access to a database 801. The database 801 may be external and/or may comprise the memory 703 and/or other storage device. The universal reader/writer 200 may be connected to the database 801 via the computer 500, a network 802, and/or a server 800. The network 802 may be, e.g., a telephone network and/or the internet.

Figure 9:
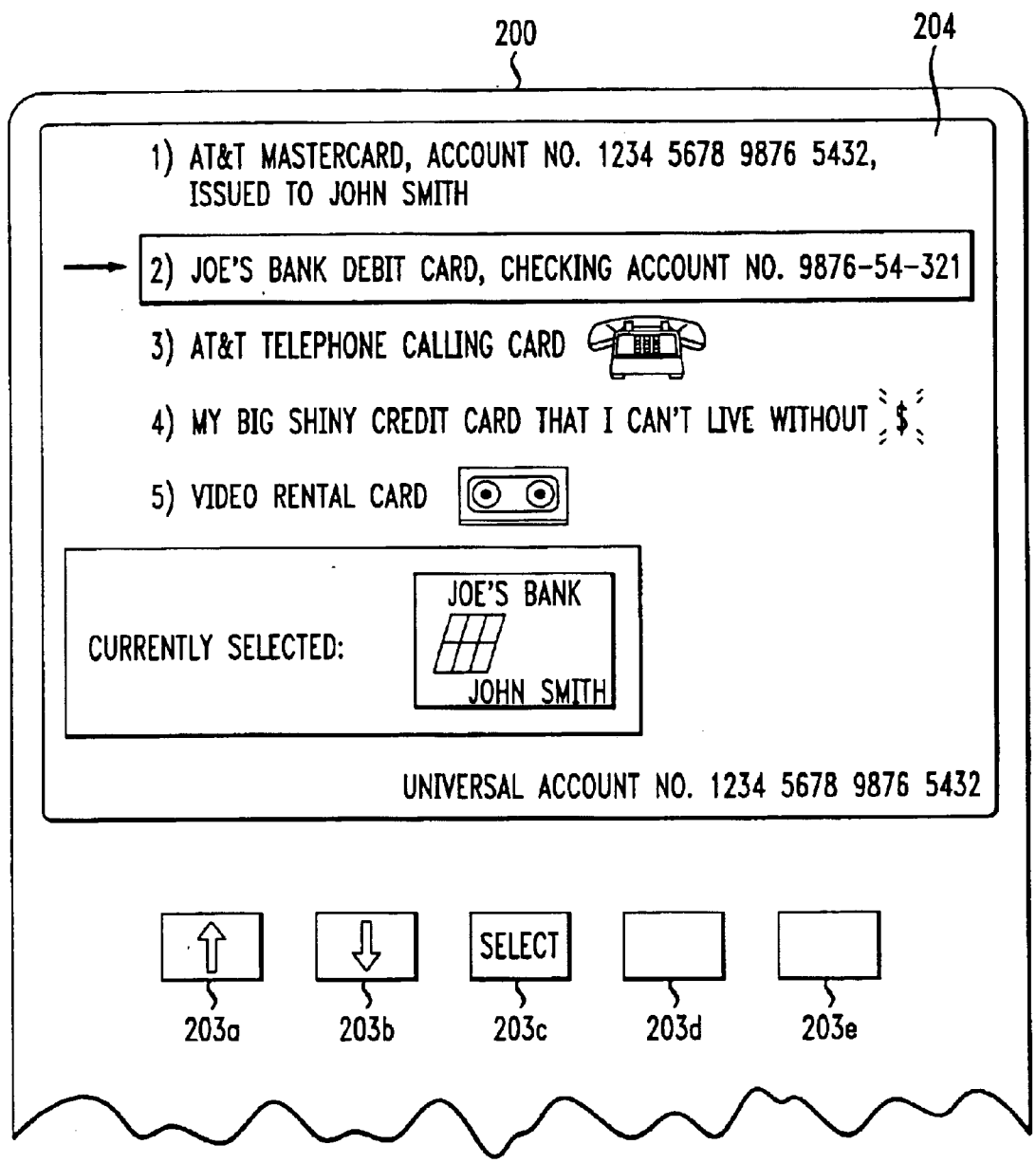
FIG. 9 shows a portion of the universal reader/writer of FIG. 2A.

Referring to FIG. 9, the display 204 of a universal reader/writer (in this example, the universal reader/writer 200) may be used as an input and/or output interface between the universal reader/writer 200 and the user. The display 204 may provide messages and prompts to the user to aid in the operation of the universal reader/writer 200. The display 204 may further show a list of various conventional cards that the universal card 100 may emulate. To scroll through the list, an up button 203a and/or a down button 203b may be used. To select a particular card from the list, a SELECT button 203c may be used. A box is shown drawn around one of the cards listed in order to highlight the card that is currently selected. The universal reader/writer 200 may have other buttons (e.g., buttons 203d, 203e) for other functions as well. Alternatively, the display 204 itself may be touch-sensitive and may be used for selection and/or scrolling instead of the buttons 203. Although FIG. 9 shows the display of the universal reader/writer 200, the displays of other embodiments of universal reader/writers described herein may also be similarly configured.

In operation, a user may want to obtain a universal card 100 and universal reader/writer (e.g., universal reader/writer 200) so that the user may be removed of the burden of carrying all of his or her conventional magnetic stripe cards around. One way of providing the user with the ability to transform the universal card 100 is to issue a portable universal reader/writer along with the universal card 100. For security reasons, it is preferable that only an authorized agent with specialized equipment (e.g., terminal 500) would be able to enter the account information from conventional cards into the database 801 and into the user's personal universal reader/writer 200. The authorized agents would preferably be authorized by an authorizing agent (such as AT&T) that owns/maintains the database 801 and that issues the universal cards and universal reader/writers. The following is an exemplary scenario, with reference to FIG. 5, of how a user may obtain a new universal card and universal card reader/writer:

1. The user would order the universal card 100 and universal reader/writer 200 from an authorizing agent or from a party authorized to distribute universal cards and universal reader/writers. The universal card 100 and the universal reader/writer 200 may be dispensed together as a set, and these two items may be provided for a single price (e.g., a predetermined amount or even free).

2. After receiving the universal card 100 and universal reader/writer 200, the user would go to an agent authorized by the authorized agent (or the authorizing agent itself) to activate the universal card 100 and universal reader/writer 200. The user would preferably bring identifying documents to prove his or her identity (e.g., passport, driver's license, birth certificate, etc.), as well as whichever conventional cards (e.g., credit cards, ATM cards, etc.) the user desires to be programmed into the user's universal reader/writer 200 and into the database 801.

3. The authorized agent would verify that the user is who he or she claims to be and that the user is the owner of the identifying documents.

4. The authorized agent would then connect the user's universal reader/writer 200 to the terminal 500 controlled by the authorized agent. In response, the terminal 500 would access the database 801 via the network 802. A digital certificate may be used to alert both the universal reader/writer and the database 801 and/or server 800 that the authorized agent and the terminal 500 are currently authorized by the authorizing agent.

5. The user would enter security information (such as by placing the user's finger into the fingerprint reader 502 and/or by entering a PIN via the keyboard 503). The security information (e.g., the user's fingerprint and/or the user's PIN) would then be forwarded via the network 802 to the database 801 for storage.

6. The authorized agent would then enter the required data for each conventional card into both the user's universal reader/writer 200 and the database 801. This may be accomplished manually and/or by swiping/inserting the various conventional cards into the card reader 504 of the terminal 500. Each of the conventional cards may have recorded on their own magnetic stripes "account identification data" that identifies each of the cards. Such account identification data may include, for example, the account number associated with the card. A number of different conventional cards may be entered into the universal reader/writer 200, such as two cards, three cards, ten cards, thirty cards, or even more.

The universal reader/writer 200 issued with the universal card 100 may thus have stored in its memory a list of all of the cards that may be emulated by the universal card 100, along with the account identification data for those cards. For example, the universal reader/writer 200 may have stored in its memory 703 the account identification data for two different credit cards, an ATM bank card, a movie rental card, and a telephone calling card, which may be all registered to the same user or entity.

Changes to what is stored in the universal reader/writer 200 may be made by any authorized agent whenever desired by the user. This may be desirable when, for example, the user obtains a new credit card account and/or cancels an existing credit card account.

Now that the user has a configured universal reader/writer 200 and an activated universal card 100, the user may now transform his or her universal card 100 into whichever card the user chooses, from a list of the conventional cards entered by the authorized agent into the universal reader/writer 200 and the database 801. For example, if the user wants to charge a purchase to his or her VISA account, the user may transform his or her universal card 100 to emulate a VISA card with the VISA account number. The transformation may be obtained by writing the information that would normally be on the magnetic stripe of the emulated VISA card onto the magnetic stripe of the universal card 100 using the magnetic read/write unit 706 of the universal reader/writer 200. Thus, when the merchant swipes the universal card, the purchase would be charged to the user's VISA account, just as though the user had provided the merchant with a conventional VISA card. If the user later wants to charge a purchase to his or her corporate American Express account, the card may be similarly transformed from the VISA card to an American Express card with the user's corporate American Express account number.

As discussed above, it may be desirable to issue a portable universal reader/writer along with the universal card 100. However, for security reasons, it is preferable that the universal reader/writer 200 that is provided to an owner of a universal card 100 not be capable of writing to any other card except for the universal card 100 with which the universal reader/writer 200 was issued. Thus, the user would not be able to use the universal reader/writer 200 to create multiple copies of credit cards and/or other types of conventional cards. Further, the user should preferably be required to pass a security test each time he or she wishes to use the universal reader/writer 200 and/or write to the universal card 100. For example, as discussed above with regard to FIG. 2A, the universal reader/writer 200 may include the fingerprint reader 202, wherein only the universal card owner's fingerprint would be sufficient to pass the security test. Alternatively, the universal card owner's voice print may be required. As another type of security test, the user may be required to enter a predetermined and secret PIN into the universal reader/writer 200 in order to write to the universal card 100. The PIN could be entered, e.g., via the buttons 203 or via the display 204 if the display is a touch-sensitive display.

The following is an exemplary method for a user to transform his or her universal card 100 into another card using the universal reader/writer 200:

1. The user inserts the universal card 100 into (or swipes the universal card through) the slot 201 of the universal reader/writer 200. The magnetic read/write unit 706 of the universal reader/writer 200 may automatically read account identification data from the one or more magnetic stripes 105, 106 of the universal card 100. The account identification data may include the universal account number that identifies the universal card 100. Preferably, the universal account number would be read from a magnetic stripe different from the magnetic stripe used for card emulation. For example, magnetic stripe 105 may be used for card emulation (i.e., wherein conventional magnetic stripe card readers read from magnetic stripe 105 to determine the information related to the card that is being emulated), and magnetic stripe 106 may be used to store the universal account number.

2. The user performs the security test (if required). This may involve, for example, the user placing his or her finger on the universal reader/writer's fingerprint reader 202 and/or entering a predetermined PIN using the buttons 203 or the display 204 (if a touch sensitive display is used).

3. If the user passes the security test, the universal reader/writer's display 204 may indicate the name, description, and/or account number of the target card that will be emulated by the universal card 100. The display 204 may further indicate the universal account number 101 identifying the universal card 100. An example of how the display 204 might look is shown in FIG. 9.

4. The user may press buttons 203a, 203b on the universal reader/writer 200 in order to cycle through the various conventional cards and account numbers that the universal card 100 can emulate. Each time one of the buttons 203a, 203b is pressed, a name, description and/or account number (e.g., "AT&T Mastercard, account no. 1234 5678 9876 5432, issued to John Smith", or "Joe's Bank Debit Card, checking account no. 9876-54-321") may appear on the display and/or be highlighted on the display (e.g., by drawing a box around the desired card to be emulated). The descriptions may be customized by the user in order to easier keep track of the various cards (e.g., a particular credit card may be custom-named to be displayed as "My big shiny credit card that I can't live without", such as is shown in FIG. 9). In addition, an image and/or icon (which may also be customizable) depicting the conventional cards may appear on the display 200 for easy identification. If the wallet-sized universal reader/writer 250 is used, the user may select which card is to be emulated by pressing the appropriate button 251a–e.

5. When the name, description, and/or account number that the user desires is displayed and/or highlighted, the user may press the SELECT button 203c to transform the universal card 100 into the selected conventional card (i.e., such that the universal card 100 emulates the selected conventional card). Using the magnetic read/write unit 706, the universal reader/writer 200 may write the appropriate information for the selected card into the one or more magnetic stripes 105 and/or 106 of the universal card 100. If the user had selected a conventional VISA card (for example), the universal card 200 would thereafter emulate the selected VISA card when swiped through a merchant's card reader, a bank's ATM machine, etc.

If the user wants to transform the universal card 100 but has forgotten to bring the universal reader/writer 200, the universal card 100 may alternatively be transformed using the facilities of an authorized agent as defined above, as well as from any other party authorized by the authorizing agent to transform the user's universal card 100, such as a merchant (e.g., department store, restaurant, grocery store, video rental store, etc.), bank, telephone company office and/or retail outlet, and/or federal/state government office. Such a "transformation-authorized" party may have a universal terminal, such as the terminal 500 shown in FIG. 5, that has access to the network 802, and that has the capability of obtaining the appropriate information from the server 800 and/or database 801 that allows the transformation-authorized party to transform another user's universal card 100.

An example of how a transformation-authorized party may be used to transform a user's universal card 100 is as follows:

1. The authorizing agent would maintain the database 801 that contains a plurality of universal account numbers. For each universal account number, the database would have stored the list of accounts to which each of the universal cards may be transformed, as well as the information necessary to transform the cards.

2. The universal terminal 500 maintained by the transformation-authorized party would have access to the database 801 via the telecommunications network 802.

3. To transform the universal card 100, the owner of the card would insert the universal card 100 into the magnetic stripe reader 504 of the terminal 500. The magnetic stripe reader 504 would read the universal account number from the one or more magnetic stripes 105, 106 on the universal card 100. The terminal 500 would also access the database 801 to obtain data associated with the universal account number read from the universal card 100.

4. The user may then be required to pass a security test (as discussed above) in order to prove ownership of the universal card 100. To pass the test, the user's input information (e.g., the user's fingerprint as read by the fingerprint reader 502) would be compared with the data retrieved from the database 801.

5. If the user passes the security test, the display 501 on the terminal 500 may show the name and/or the account number of the account to which the universal card 100 is currently transformed (the "emulated account number"). The user would then transform the universal card 100 just as if the universal card 100 were inserted into the user's own universal reader/writer 200. In other words, the user would cycle through a list of the choices of which card to emulate, and the user would select the card to be emulated from the list of choices. The universal card 100 would then be ready for use as the emulated conventional card.

As the maintainer of the database 801, the authorizing agent may charge a fee each time someone accesses the database 801 (for example, in order to authenticate the identity of an individual). There are many reasons why one would want to authenticate the identity of an individual. For instance, a merchant may want to verify the identity of a customer who makes a large credit card purchase. A bank may wish to verify the identity of a customer who makes a large withdrawal from his or her account. An airline may want to verify the identity of its passengers. The police may want to verify the identity of a suspect. Corporations or the government may want to verify the identity of visitors to secure areas.

In addition, new services could be developed that rely on authentication of a person's identity using the database 801. For example, suppose a person purchases a ticket via telephone or the internet to a sporting event or for an airline flight. Instead of mailing a physical ticket to the person, a record of the purchase could simply be recorded in the database 801. When the person arrives at the stadium or the airport, he or she would simply touch an electronic fingerprint reader, which would then access the database 801 to verify that a ticket was purchased. Admission would then be automatically granted once verification was made.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Further, although many of the exemplary embodiments described herein relate to the universal reader/writer 200, any of the other universal reader/writers 300, 400, 600 may be substituted in those embodiments.

I claim:

1. A method for configuring a device that transforms a first card into another card selected from a plurality of cards, and confirming a transaction using one of the plurality of cards, the method comprising the steps of:

storing a first account identification data for a first card to a database;

storing account identification data for a second card and a third card to the database, the database associating the account identification data of the first card with the account identification data of the second and third cards;

storing the account identification data for each of the first card, the second card and the third card into a memory of the device, the memory and the device being separate from the database;

storing a transaction data to the database, the database associating the transaction data with the account identification data of one of the second and third cards; and verifying a transaction using the transaction data.

2. The method of claim 1, further including the step of generating a security test, the step of storing being performed depending upon whether the security test is passed.

3. The method of claim 1, further including the step of generating a security test, the step of verifying being performed depending upon whether the security test is passed.

4. The method of claim 1, wherein the step of storing the account identification data of the second and third cards into the database includes reading the account identification data from the second and third cards using a magnetic read head.

5. The method of claim 1, wherein the step of storing the transaction data to the database includes sending the account identification data of the second and third cards to the database via at least one of a telephone network and the Internet.

6. The method of claim 1, wherein the step of storing the transaction data to the database includes sending the transaction data to the database via at least one of a telephone network and an Internet.

* * * * *